(12) United States Patent
Schmeski

(10) Patent No.: US 11,071,175 B2
(45) Date of Patent: Jul. 20, 2021

(54) REMOVABLE ELECTRIC GRILL CONTROLLER WITH MOUNT

(71) Applicant: Weber-Stephen Products LLC, Palatine, IL (US)

(72) Inventor: Kevin James Schmeski, Romeoville, IL (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 779 days.

(21) Appl. No.: 15/600,310

(22) Filed: May 19, 2017

(65) Prior Publication Data

US 2018/0338351 A1    Nov. 22, 2018

(51) Int. Cl.
*H05B 3/66* (2006.01)
*A47J 37/04* (2006.01)
(Continued)

(52) U.S. Cl.
CPC ............... *H05B 3/66* (2013.01); *A47J 37/04* (2013.01); *A47J 37/0709* (2013.01);
(Continued)

(58) Field of Classification Search
CPC ........ H05B 3/66; H05B 3/06; H01R 13/4534; A47J 37/04; A47J 37/0709; A47J 37/06;
(Continued)

(56) References Cited

U.S. PATENT DOCUMENTS 4,164,701 A * 8/1979 Gulledge ............... G01R 31/67
324/508
4,662,349 A    5/1987 McKenzie
(Continued)

FOREIGN PATENT DOCUMENTS

CA    2139083 A1    6/1996
CN    1752561    3/2006
(Continued)

OTHER PUBLICATIONS

Expert Report on Application for Invention Patent dated Nov. 12, 2018 in corresponding Chilean Application No. 201801332.
(Continued)

*Primary Examiner* — Phuong T Nguyen
(74) *Attorney, Agent, or Firm* — Hanley, Flight & Zimmerman, LLC

(57) ABSTRACT

The present disclosure related to an electric grill's housing, controller, and a mounting bracket which mounts the controller to the housing. The mounting bracket is generally hollow and forms a thermal barrier between the controller and the housing, wherein the thermal barrier protects the controller from heat generated in the housing. As a result, the controller does not require insulation and may include lower temperature rated components. Moreover, the mounting bracket may have metallic tabs which interface with spring elements on the controller, thereby fastening the controller to the bracket. These spring elements and metallic tabs may be in electric communication with the housing, thereby allowing the controller to act as an electric ground with respect to the housing.

18 Claims, 13 Drawing Sheets

(51) Int. Cl.
*A47J 37/07* (2006.01)
*F24C 15/10* (2006.01)
*A47J 37/06* (2006.01)

(52) U.S. Cl.
CPC .............. *F24C 15/103* (2013.01); *A47J 37/06* (2013.01); *A47J 37/0786* (2013.01)

(58) Field of Classification Search
CPC ................ A47J 37/0786; A47J 37/0676; A47J 37/1261; A47J 37/0611
USPC ......... 99/331, 375, 376, 377, 378, 380, 400, 99/425, 444, 446; 219/450.1, 451.1, 219/452.11, 455.11, 455.12, 507, 541
See application file for complete search history.

(56) References Cited

U.S. PATENT DOCUMENTS

| | | | |
|---|---|---|---|
| 6,064,042 | A | 5/2000 | Glucksman |
| 6,252,204 | B1 | 6/2001 | Po-Hei |
| 7,301,127 | B1 | 11/2007 | Derridinger, Jr. |
| 2005/0202699 | A1 | 9/2005 | Fang |
| 2008/0257169 | A1* | 10/2008 | Tienor ................. A47J 37/0611 99/377 |
| 2012/0152126 | A1 | 6/2012 | Robinson |
| 2013/0119047 | A1* | 5/2013 | Driussi ................... D06F 58/30 219/507 |
| 2013/0237077 | A1* | 9/2013 | Aono ................. H01R 13/4538 439/137 |
| 2017/0020334 | A1 | 1/2017 | Sorenson |
| 2018/0000277 | A1 | 1/2018 | Knappenberger |
| 2018/0004271 | A1 | 1/2018 | Knappenberger |
| 2018/0007738 | A1 | 1/2018 | Knappenberger |
| 2018/0007739 | A1 | 1/2018 | Knappenberger |

FOREIGN PATENT DOCUMENTS

| | | |
|---|---|---|
| CN | 205181128 | 4/2016 |
| JP | S55-110119 U | 8/1980 |
| JP | H09224851 | 9/1997 |
| JP | 2007190041 | 8/2007 |
| WO | 2016141335 A1 | 9/2016 |

OTHER PUBLICATIONS

Extended Search Report dated Oct. 19, 2018 in corresponding European Application No. 181728718.
Official Action dated Sept. 3, 2019 in corresponding Japanese Application No. 2018-094323.
IP Australia, "Notice of grant for patent," issued in connection with Australian Patent Application No. 2018203352, dated Jun. 25, 2020, 1 page.
IP Australia, "Examination report No. 1," issued in connection with Australian Patent Application No. 2018203352, dated May 10, 2019, 3 pages.
IP Australia, "Examination report No. 2," issued in connection with Australian Patent Application No. 2018203352, dated Sep. 17, 2019, 3 pages.
Canadian Intellectual Property Office, "Notice of Allowance," issued in connection with Canadian Patent Application No. 3,004,718, dated Feb. 21, 2020, 1 page.
Canadian Intellectual Property Office, "Office Action," issued in connection with Canadian Patent Application No. 3,004,718, dated Apr. 11, 2019, 4 pages.
China National Intellectual Property Administration, "First Office Action," issued in connection with Chinese Patent Application No. 201810482148.1, dated Sep. 28, 2020, 45 pages.
European Patent Office, "Communication under Rule 71(3) EPC," issued in connection with European Patent Application No. 18 172 871.8, dated Jan. 20, 2020, 6 pages.
European Patent Office, "Extended European Search Report," issued in connection with European Patent Application No. 20167309.2, dated Jul. 7, 2020, 8 pages.
Japanese Patent Office, "Decision to Grant Patent," issued in connection with Japanese Patent Application No. 2018-094323, dated Apr. 13, 2020, 4 pages.
South Africa Patent Office, "Acceptance of Complete Specification," issued in connection with South African Patent Application No. 2018/03319, dated Dec. 13, 2018, 1 page.
European Patent Office, "Communication pursuant to Article 94(3) EPC," issued in connection with European Patent Application No. 20 167 309.2, dated Apr. 6, 2021, 3 pages.
IP Australia, "Examination report No. 1," issued in connection with Australian Patent Application No. 2020203911, dated Mar. 9, 2021, 8 pages.
Japan Patent Office, "Official Action," issued in connect with with Japanese Patent Application No. 2020-088833, dated Apr. 20, 2021, 5 pages. (English summary included).

* cited by examiner

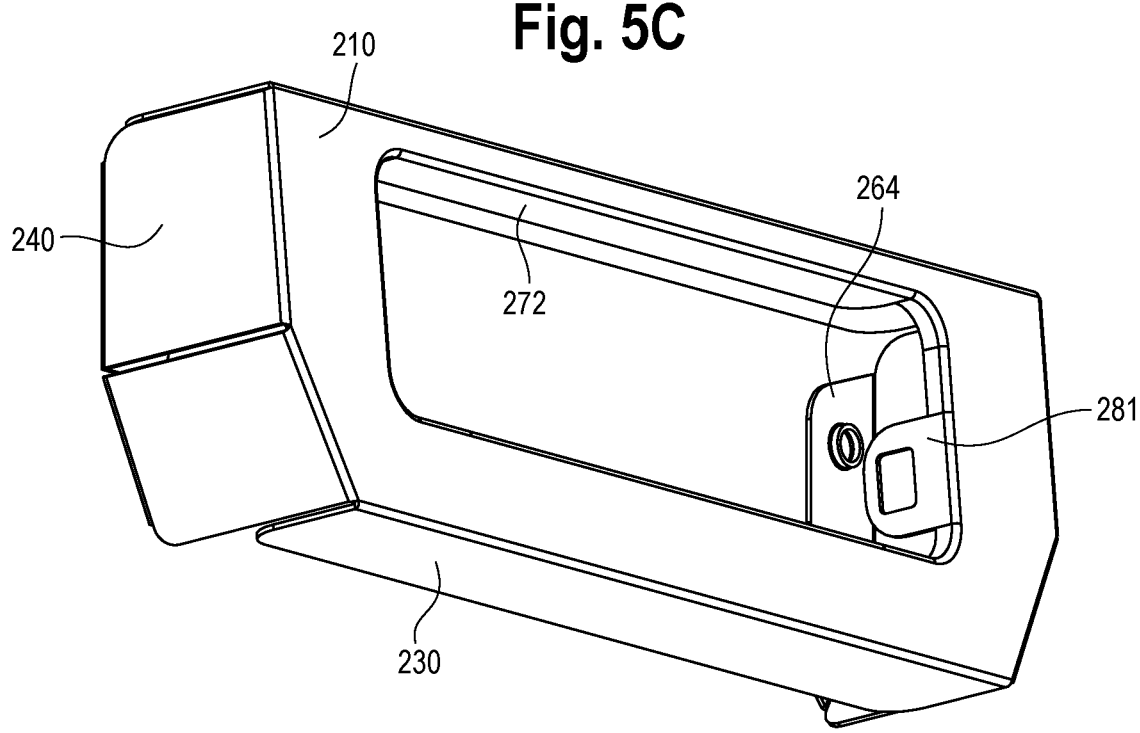
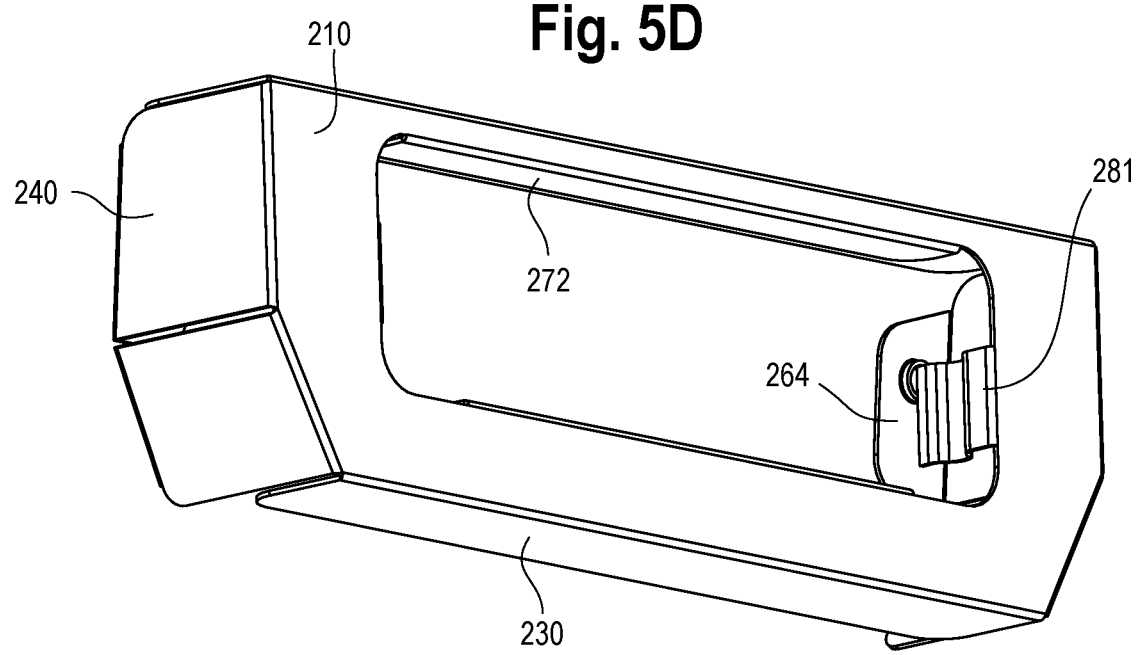

REMOVABLE ELECTRIC GRILL CONTROLLER WITH MOUNT

FIELD OF THE INVENTION

The present inventions relate to an electric grill having a removable controller and a mounting bracket for attaching the controller to an electric grill's housing. More specifically, the inventions provide a removable controller which is in electric contact with the housing and may therefore act as an electric ground. Moreover, the inventions provide for a thermal barrier within the mounting bracket for protecting the controller's internal electronics from heat.

BACKGROUND OF THE INVENTION

There is an increasing desire for electric grills. This is particularly true because the urban population is expanding, and many urban or other environments may not easily permit the use of traditional or charcoal grills. With the increasing demand for electric grills comes an increasing demand for electronic and/or electro-mechanical controllers suitable for controlling an electric grill while withstanding high heat and other harsh conditions associated with an electric grill's environment.

For example, there is an increasing demand for electronic controllers which may provide temperature control and/or remote connectivity to electric grills. Likewise, there is an increasing demand for electro-mechanical controllers. To be suitable for use in conjunction with an electric grill used in an outdoor environment, the electronic controller must be able to withstand high heat and other caustic environmental conditions. These environmental conditions include sun, rain, snow, grease from food stuffs, and cleaning products. Moreover, the electronic controller should be removable so it can be stored indoors when not in use. Further, the electronic controller should be in electrical communication with the electric grill's housing, thereby allowing the electronic controller to act as an electrical ground with respect to any stray or leaked currents that may reach the electric grill's housing. Establishing an electrical ground is an important safety feature because stray or leaked currents in the electric grill's housing present a danger to a user.

There are a number of available electric cooking devices, such as the George Foreman Plate Grill (and similar devices), panini presses, electric griddles, and the like. However, these prior art electric cooking devices are typically intended for indoor use, and operate at relatively lower temperatures than electric grills suited for outdoor environments. As such, many electric cooking devices have no need for a removable electronic controller, or protection from relatively high temperatures.

Moreover, prior art electric grills intended for outdoor use are designed to include a relatively large amount of insulation to protect controllers from heat. Traditional heat insulation may include fiberglass. The use of heat insulation may be expensive and difficult to manufacture, and such insulation may degrade from heat or other environmental conditions. Moreover, traditional insulation materials may potentially impede an electronic controller's ability to act as an electrical ground relative to the electric grill's housing. Further yet, traditional controllers are manufactured using high-temperature plastic, such as Ryton, and electronics that are rated for high temperature use.

Thus, there is a need for a new and improved electronic controller and mounting bracket that shields electronics from heat, is removable, connects an electric grill's housing to electrical ground, and is made of a material that can withstand an electric grill's harsh and caustic outdoor environments. It would be advantageous to provide a thermal barrier between an electric grill's housing and its controller, thereby allowing the controller to be manufactured without high-temperature components. Moreover, a thermal barrier would eliminate the need for traditional insulation, such as fiberglass. A person of skill in the art, not having the benefit of this disclosure, would not be motivated to replace traditional insulation techniques with a thermal barrier inside a mounting bracket made of sheet metal because sheet metal is a heat conductor.

SUMMARY OF THE INVENTIONS

The present inventions preserve the advantages of known electric grill controllers and mounting brackets, and also provide new features, objects, and advantages summarized herein.

For example, embodiments of the inventions include an electric grill assembly, comprising a housing; a mounting bracket having a front surface, a top surface, a left side, a right side, a bottom surface, and a generally open back plane, said mounting bracket's back plane having at least two flanges for mounting said mounting bracket to said housing; an elongated slot spanning along the mounting bracket's front surface; a first and second tab respectively positioned on the slot's left and right edges; and an electronic controller having a first and second spring element, said first and second spring element being aligned to respectively engage said first and second tab when said electronic controller is attached to said mounting bracket.

In additional embodiments, said housing and said mounting bracket are made of electrically conductive metal. Moreover, the first and second spring elements can be made of electrically conductive metal. A power cord may also be provided, wherein said first and second spring elements are in electrical communication with the power cord's ground. In embodiments, a thermal barrier is provided between the housing and the electronic controller when the electronic controller is attached to said mounting bracket.

Further yet, at least one thermocouple may be attached to said electronic controller and there may be an opening in said housing, wherein said opening is aligned to receive said thermocouple when said electronic controller is attached to said mounting bracket. The electronic controller is electro-mechanical.

A mounting bracket for mounting a controller to an electric grill housing is also provided, comprising a front surface, a top surface, a bottom surface, a left surface, a right surface, and a generally open back plane; at least two flanges oriented along said back plane, each flange having a hole for fastening the mounting bracket to the housing; an elongated slot oriented along said front surface; a first lip and second lip respectively extending along opposite edges of the elongated slot and substantially perpendicular to said elongated slot; and a first and second tab opposite each other, extending into said mounting bracket and substantially perpendicular to said elongated slot. The mounting bracket may be made of a metal.

A system for mounting an electric grill's controller to a housing may comprise a housing; a mounting bracket having a front surface, a top surface, a bottom surface, a left side, a right side, and a back side; the mounting bracket being affixed to the housing; an elongated slot oriented on the mounting bracket's front surface; and a controller having two engagement members configured to mate with the elongated slot. A first tab and a second tab may be positioned on opposite edges of the elongated slot, respectively, and perpendicularly extend into the mounting bracket. The first and second engagement members may respectively have a first and second spring element aligned to engage mounting bracket's first and second tab. The first and second tab each may have an opening for receiving the first and second spring element when the controller is in a fastened position. The mounting bracket can be hollow. When the controller is in a fastened position, the mounting bracket's hollow interior may form a thermal barrier. The housing, mounting bracket, and spring elements can be made of a metal, and the spring elements may connect to an electric ground via a power cord.

In some embodiments, an electric grill comprises a housing; a controller; and a mounting bracket forming a thermal barrier between the housing and the controller. The mounting bracket can be made of a sheet metal, and the sheet metal may be steel. Additionally, the mounting bracket can be configured to receive the controller. In embodiments, the controller has a plurality of spring elements for removably engaging a corresponding tab on the mounting bracket. Moreover, the controller can be in electric communication with the housing. The controller may have a power cord and act as an electric ground with respect to the housing. In further embodiments, the controller has at least one electric contact for a voltage line and one electric contact for a neutral line, and each electric contact is aligned with an opening in the housing for interfacing with a heating element.

Accordingly, it is an object of the present inventions to provide a mounting bracket for removably fastening a controller to an electric grill housing.

It is an additional object of the inventions to provide a mounting bracket made of a material, such as a metal (e.g. steel), which can withstand harsh environmental conditions.

It is an additional object of the present inventions to provide a mounting bracket which forms a thermal barrier between a controller and an electric grill's housing, so as to protect the controller's internal circuitry from heat generated within the housing during cooking.

It is an additional object of the inventions to provide a controller which is in electrical communication with an electric grill's housing, through a mounting bracket, such that the controller may electrically ground the housing.

It is an additional object of the invention to provide a controller with protruding thermocouples which may be inserted into an electric grill's housing when the controller is in an engaged position, so as to measure the temperature inside the housing.

It is an additional object of the invention to provide an electric grill in which the controller which does not require high-temperature rated components or plastics.

INVENTOR'S DEFINITION OF THE TERMS

The following terms which may be used in the various claims and/or specification of this patent are intended to have their broadest meaning consistent with the requirements of law:

"Electric grill" and "Electric grill assembly," as used herein, include typical components of an electric grill, such as a controller and a housing.

"Electrical contact" or "electrical communication" means a physical connection through which electricity may follow.

"Controller" is intended to mean any electronic, digital, and/or electro-mechanical controller, unless otherwise specified.

"Temperature probe" is intended to mean any device which can sense temperature, including, but not limited to, a thermocouple.

Where alternative meanings are possible, in either the specification or claims, the broadest meaning is intended consistent with the understanding of those of ordinary skill in the art. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 5C is an isometric front view of a mounting bracket shown from the lower left perspective.

FIG. 5D is an isometric front view of a mounting bracket, having an S-tab, shown from the lower left perspective.

DETAILED DESCRIPTION OF THE PREFERRED EMBODIMENTS

Set forth below is a description of what are currently believed to be the preferred embodiments or best representative examples of the inventions claimed. Future and present representations or modifications to the embodiments and preferred embodiments are contemplated. Any alterations or modifications which make insubstantial changes in function, purpose, structure, or result are intended to be covered by the claims of this patent. The present inventions may be used as part of an electric grill, or may be adapted for use in any other electronic outdoor device.

Figure 1:
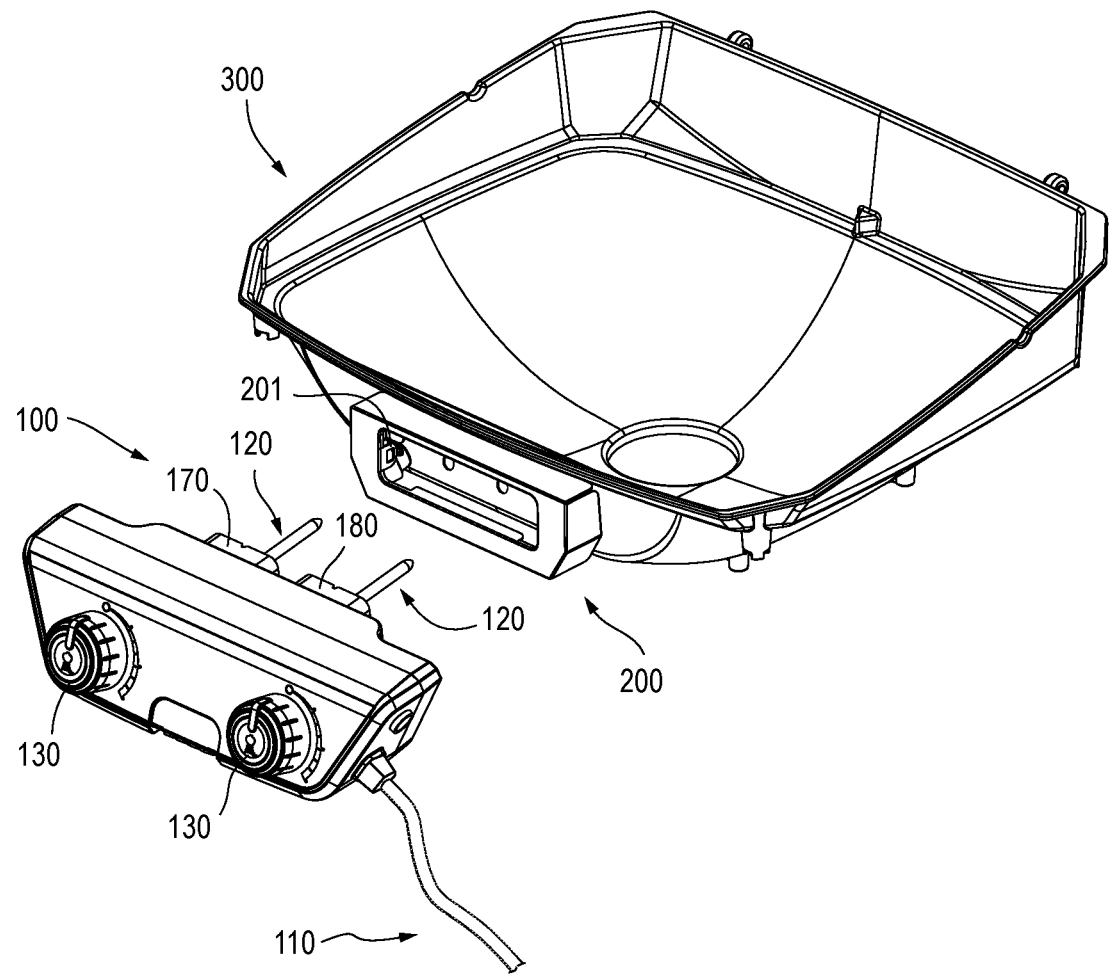
FIG. 1 shows an electric grill's controller, mounting bracket, and housing.

FIG. 1 provides context for embodiments of the invention, showing components of an electric grill assembly, including a removable controller 100, a mounting bracket 200, and an electric grill's housing 300. Throughout this disclosure, components of electronic controller 100 are referred to by reference numerals in the 100's; components of mounting bracket 200 are referred to by numerals in the 200's; and electric grill housing 300 components are referred to by numerals in the 300's.

Embodiments of the inventions provide a mounting bracket 200 which allows a controller 100 to be easily attached and removed from an electric grill's housing 300. Mounting bracket 200 may be affixed to the electric grill housing 300—which is typically formed of a metal, such as steel—via a bolt or screw 201. Rivets, or welding techniques, may also be used. Mounting bracket 200 may receive and engage electronic controller 100, thereby connecting or disconnecting the electronic controller 100 to electric grill housing 300. Furthermore, mounting bracket 200 electrically connects controller 100 to the housing 300 to act as ground with respect to the housing 300. Moreover, embodiments of the inventions provide a hollow mounting bracket 200. A thermal barrier forms in the hollow air space and protects the electronic controller's internal circuitry.

Electronic controller 100's exterior is preferably formed of a plastic housing. Other materials may be used, but it is preferred that controller 100 be formed of a material that does not conduct electricity or heat. Controller 100 has a power cord 110, which supplies electricity which can be converted to heat for cooking. Moreover, power cord 110 may plug into a wall outlet and provide an electrical ground for controller 100. Therefore, in embodiments where controller 100 is in electrical contact with housing 300, controller 100 may act as an electrical ground. Stated another way, current may travel from housing 300 through mounting bracket 200, to controller 100, and then to ground via extension cord 110. For example, manufacturing mounting bracket 200 from steel, or any other conductive material, will electrically connect controller 100 with housing 300. In such embodiments, any stray or leaked currents in the electric grill housing 300 dissipate through the electronic controller 100 and to the ground. Providing an electrical ground to the housing 300 is an important safety feature. Scenarios exist in which electric currents may inadvertently reach the housing 300, for example as a result of unsafe use. The result of an electric current reaching the housing 300 creates a risk of electric shock to a user. It is therefore desirable to provide a path for any current that inadvertently reaches housing 300 to flow to ground.

Controller 100's exterior further includes one or more engagement members 170, 180. For example, FIG. 2A, which shows controller 100 from a rear view, shows two engagement members 170, 180 in the form of raised edges. Both engagement members 170, 180 in FIG. 2A further include a spring element 190, 195, respectively. As described further below, engagement members 170, 180 and spring elements 190, 195 are used to align controller 100 in mounting bracket 200, and to securely fasten controller 100 to mounting bracket 200. For example, when controller 100 is inserted into mounting bracket 200, engagement members 170, 180 are guided by mounting bracket 200's lower lip 271 and upper lip 272 until spring elements 190, 195 align with, and engage, mounting bracket's tabs 280, 281. Engaging spring elements 190, 195 with tabs 280, 281 secures controller 100 to mounting bracket 200.

Spring elements 190, 195 may be metallic and capable of conducting electricity. In such embodiments, engaging spring elements 190, 195 with steel mounting bracket 200 (and more specifically, steel tabs 280, 281) establishes an electrical connection. Spring elements 190, 195 may be connected to power cord 110, thereby completing the electrical connection from housing 300, through mounting bracket 200, and power cord 110.

Figure 2A:
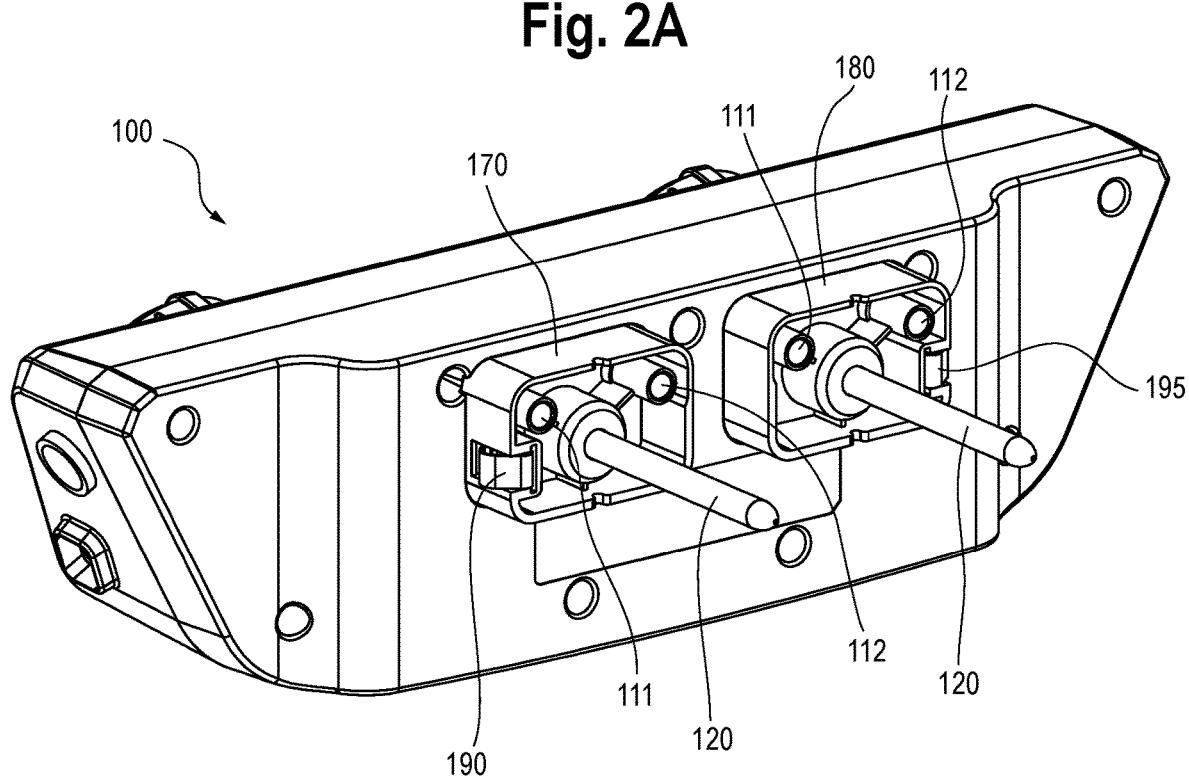
FIG. 2A is an isometric rear view of an electric grill's controller, having two engagement members.

Further yet, controller 100 may have one or more temperature probes, such as thermocouples 120. By way of example, FIGS. 1 and 2A show two thermocouples 120 protruding from controller 100's back side. As will become apparent herein, when controller 100 is engaged with mounting bracket 200, thermocouples 120 may extend through the mounting bracket 200 and into one or more openings 310 in the electric grill housing 300. From this position, temperature probes such as thermocouples 120 may measure the temperature inside the housing 300. Such temperature feedback may be used by electronic controller 100 in regulating a cooking temperature.

Figure 2B:
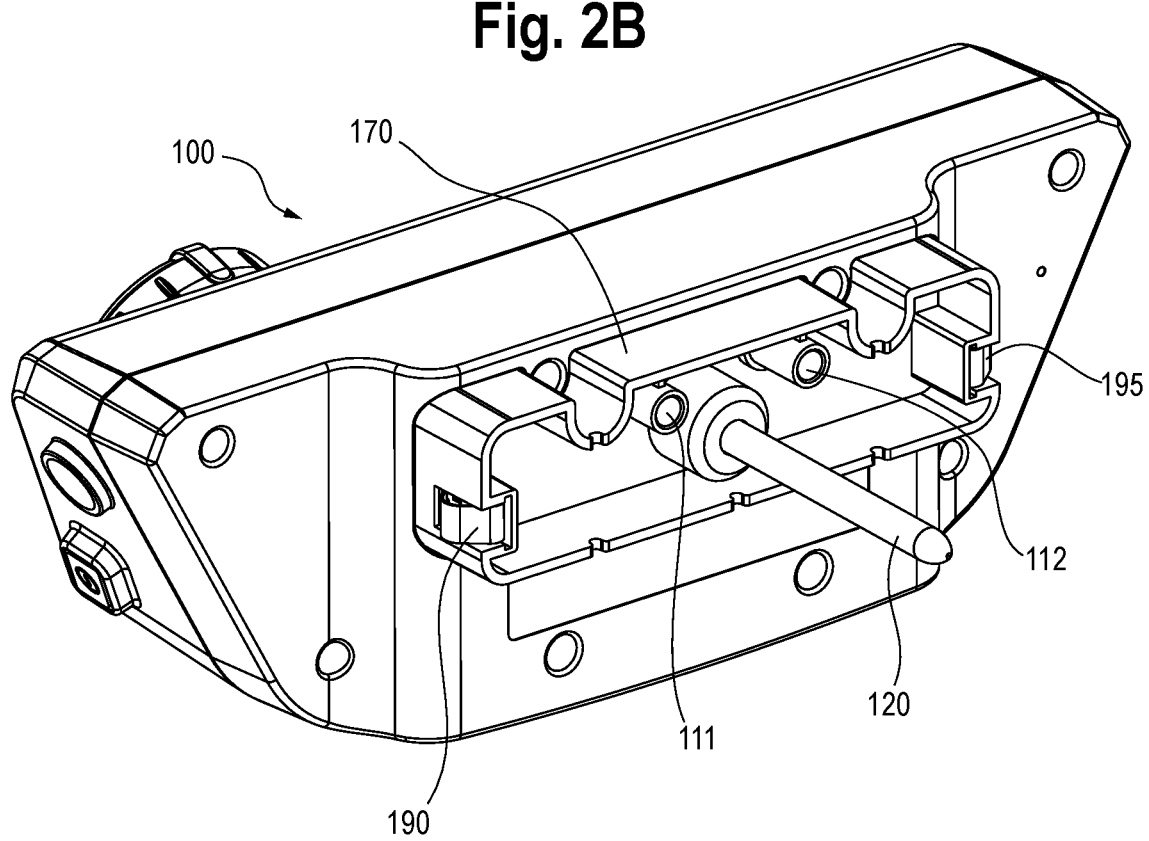
FIG. 2B is an isometric rear view of an electric grill's controller, having one engagement member.

In alternative embodiments, seen for example in FIG. 2B, controller 100 has only one thermocouple 120 and one engagement member 170, with two spring elements 190, 195 mounted to engagement member 170.

Figure 3:
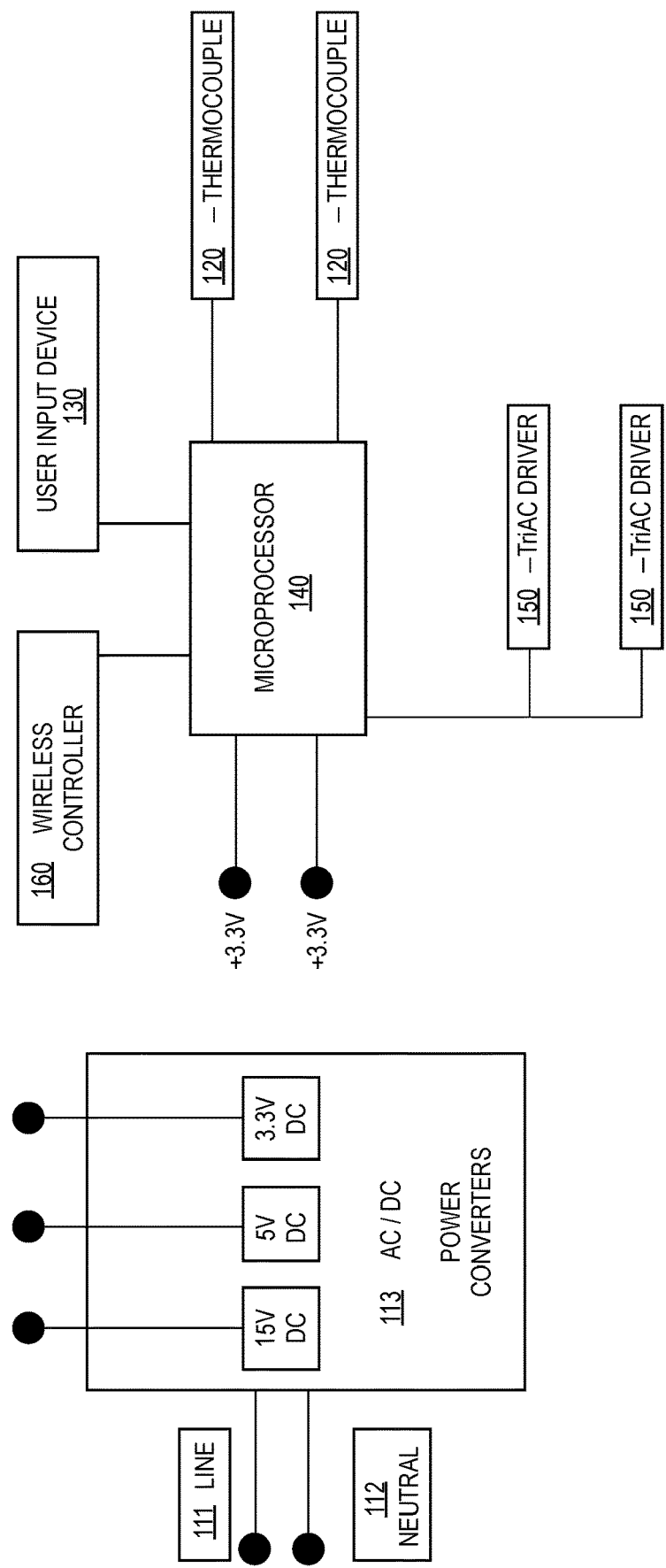
FIG. 3 is a schematic showing exemplary internal components of an electric grill's controller.

It should be understood that embodiments of the inventions may encompass electronic, digital, and/or electro-mechanical controllers. For example, embodiments of an electro-mechanical controller may include a bi-metal controller for regulating the electricity delivered to a heating element. In embodiments of the inventions using a digital controller, controller 100 may further include one or more user input devices 130, such as a control knob, for activating, adjusting, and/or controlling a cooking temperature. For example, FIG. 3 shows an exemplary schematic of electrical components of controller 100. Electricity is drawn via power cord 110, shown as line 111 and neutral 112. Optionally, power converters 113 convert a wall outlet's AC current to various steps of DC current. Further optional internal circuitry includes a microprocessor 140, which may control the temperature of an electric grill by controlling TriAC Drivers 150. It should be understood that TriAC Drivers 150 may be used to control heating elements positioned within electric grill housing 300. Embodiments may further include a wireless communication controller 160 for allowing wifi, Bluetooth, or other wireless communication with remote devices, such as cell phones, tablets, and/or computers.

Moreover, controller 100 may interface directly with heating elements (not shown) positioned within housing 300 in order to deliver electric current for heating. For example, there may be electric contacts which allow line 111 and neutral 112 (see FIGS. 2A and 2B) to interface and deliver electricity with one or more heating elements in an electric grill's housing 300. For example, electric contacts for line 111 and neutral 112 may be aligned with openings 340 in housing 300 (see e.g. FIG. 9). Through these openings 340, line 111 and neutral 112 may contact and interface a heating element, and deliver electricity to (and from) the heating element. Using digital or electro-mechanical means, controller 100 determines and controls the appropriate amount of electricity to deliver in order to achieve a desired cooking temperature.

Additional disclosure of exemplary controller 100's circuitry and functionality is provided in Applicant's co-pending U.S. patent application Ser. No. 15/200,687, entitled "Electric Grill with Current Protection Circuity," Ser. No. 15/493,611 entitled "Wireless Control And Status Monitoring For Electric Grill With Current Protection Circuitry," Ser. No. 15/200,759, entitled "Digital Power Supply," and Ser. No. 15/493,696, entitled "Digital Power Supply with Wireless Monitoring and Control." Each of these applications is hereby specifically incorporated by reference, in its entirety.

Components of controller 100 (including without limitation those components shown in FIG. 3) may be sensitive to heat generated in the electric grill housing 300. Thus, in embodiments of the inventions, mounting bracket 200 serves to protect and shield controller 100 from heat generated by cooking in electric grill housing 300 by providing a thermal barrier 290 between controller 100 and housing 300.

Figure 4:
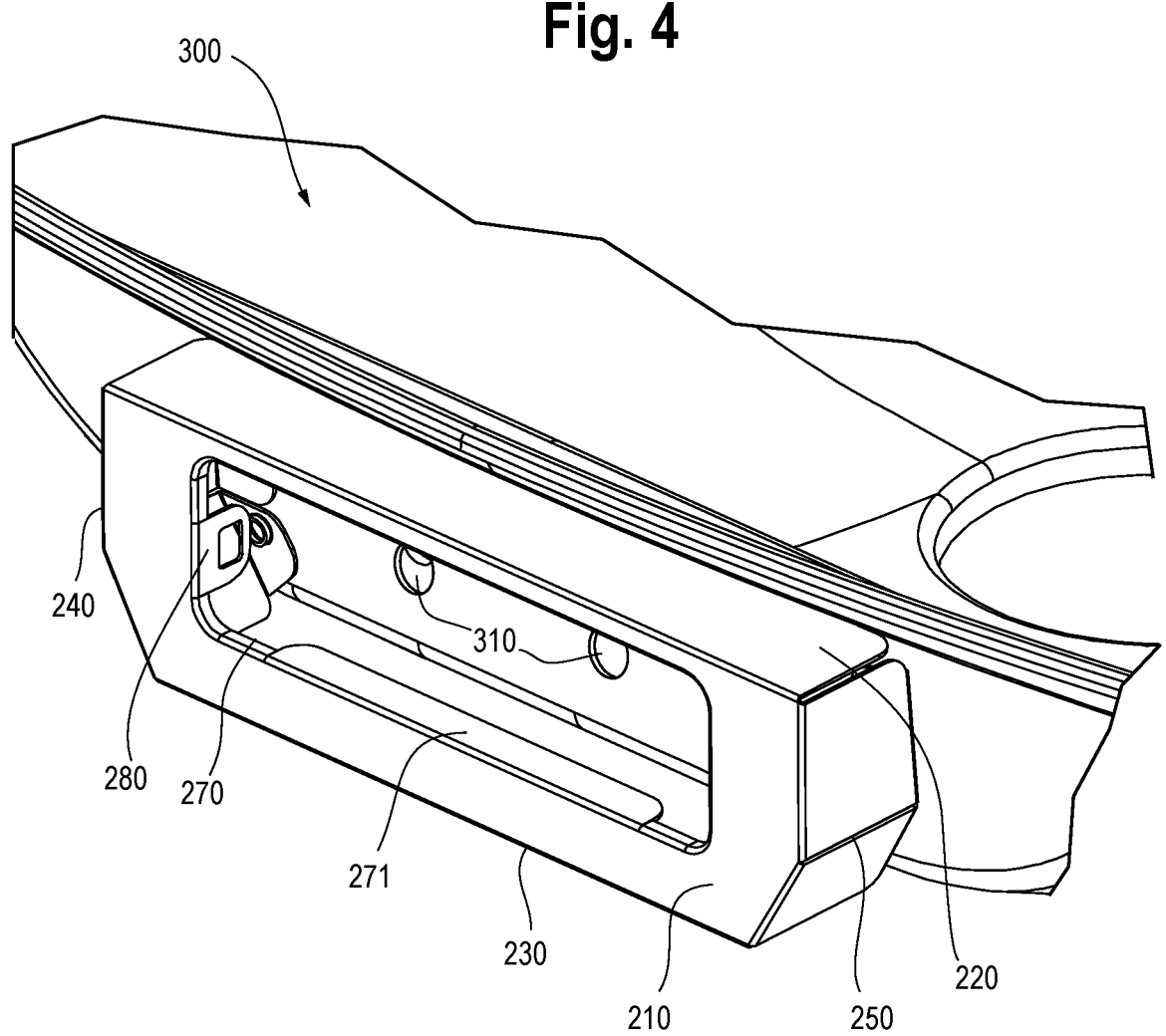
FIG. 4 is an isometric view showing a mounting bracket affixed to an electric grill's housing.
Figure 5A:
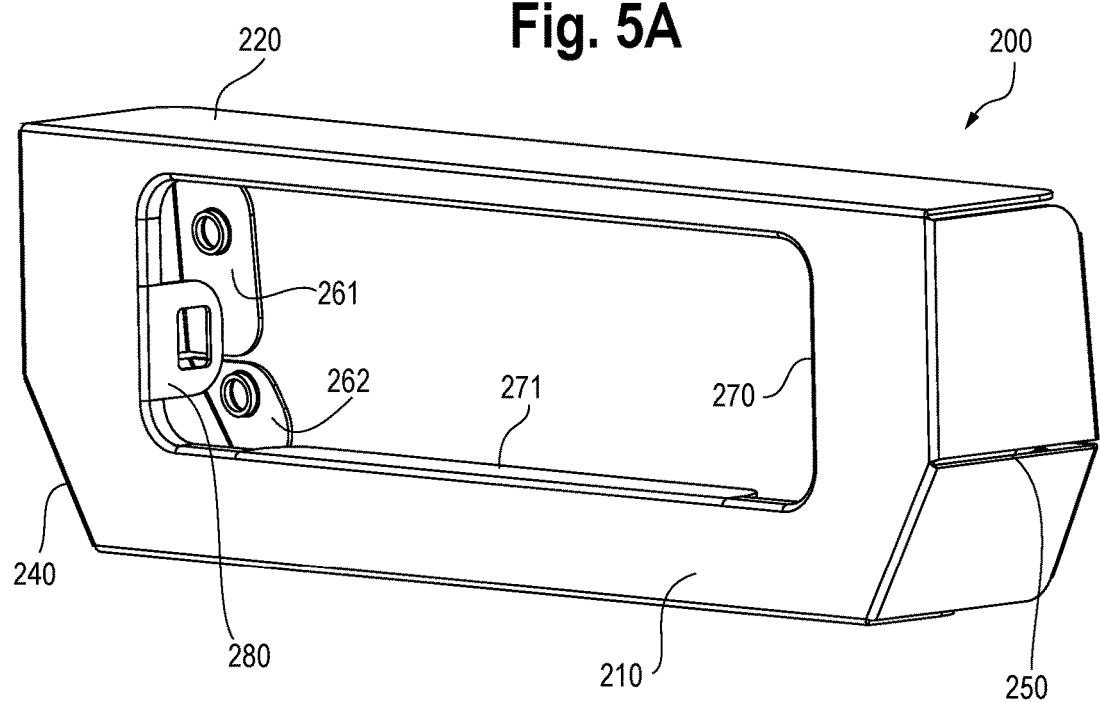
FIG. 5A is an isometric front view of a mounting bracket.
Figure 5B:
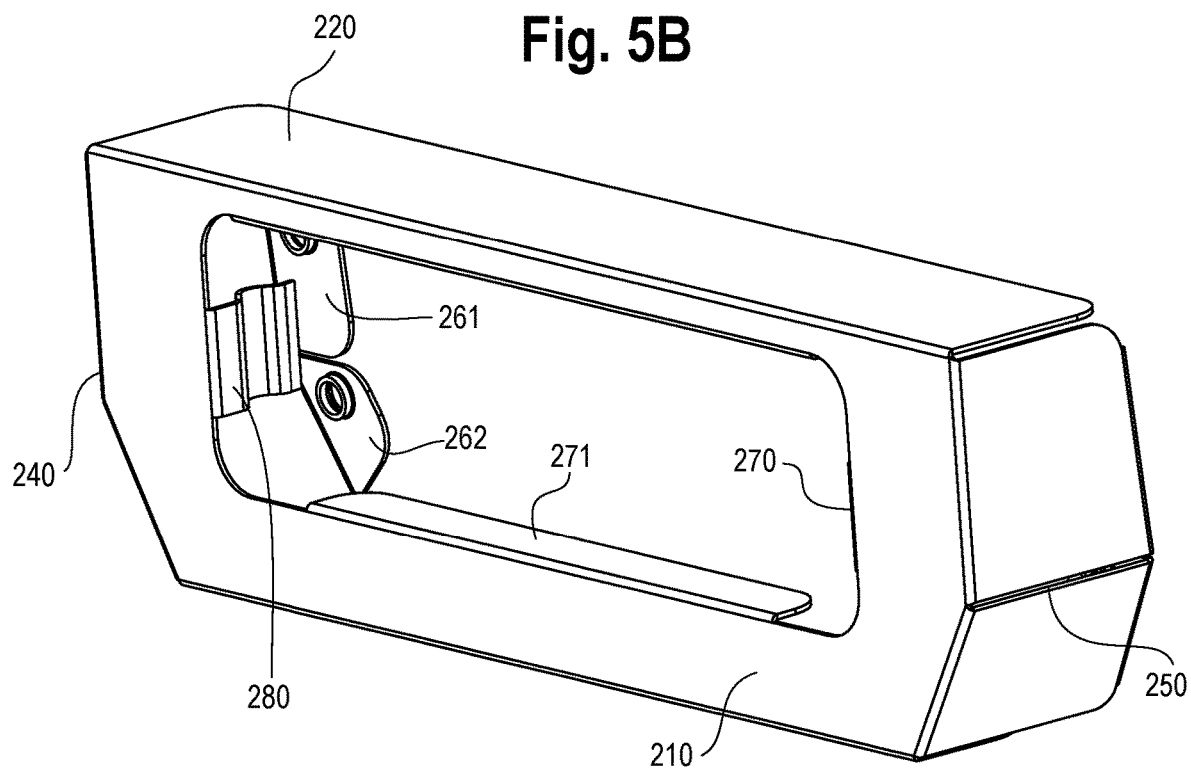
FIG. 5B is an isometric front view of a mounting bracket having an S-tab.
Figure 6:
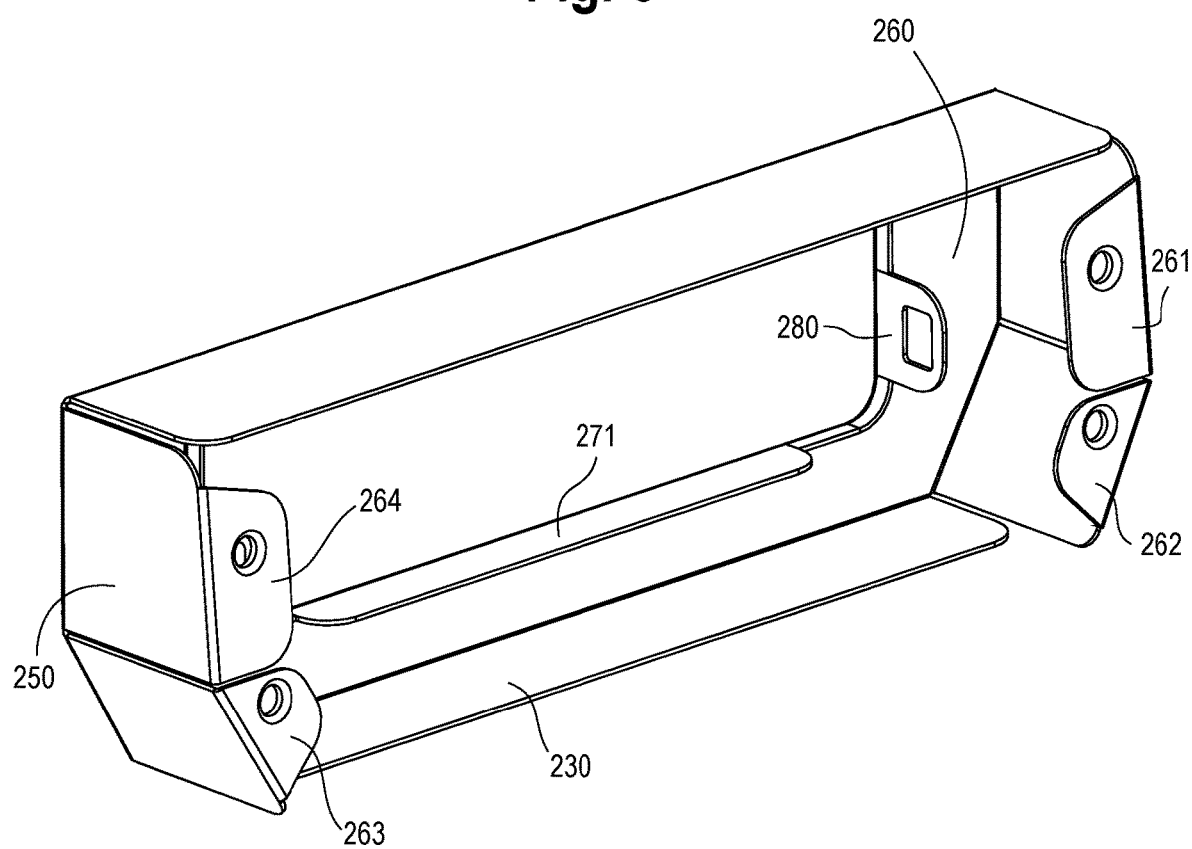
FIG. 6 is an isometric rear view of a mounting bracket.

Turning now to FIGS. 4 and 5A and 5B, isometric views of mounting bracket 200 are shown. FIG. 4 shows mounting bracket 200 affixed to an electric grill housing 300, whereas FIGS. 5A and 5B show an isometric view of the mounting bracket 200 alone. Mounting bracket 200 is three dimensional and generally hollow. It has a front surface 210, a top surface 220, a bottom surface 230, a left side 240, and a right side 250. Throughout this disclosure, mounting bracket 200 is shown to have tapered sides, though such tapered sides are not a limitation of the invention. It is understood that mounting bracket 200's shape may vary and the tapered sides are not limiting.

Mounting bracket 200's back 260 is a plane which opposes the front surface 210. The back 260 plane is generally open and may include flanges 261, 262, 263, and 264, seen for example in FIGS. 5A and 5B, which are isometric review views of mounting bracket 200. FIGS. 5C and 5D show the mounting bracket 200 from the lower left perspective. Flanges 261, 262, 263, and 264 are used to screw, bolt, or otherwise fasten mounting bracket 200 to electric grill 300. Embodiments having an open back 260 are preferable because the open back 260 reduces the contact area between mounting bracket 200 and electric grill housing 300. For example, the only points of contact may be the flanges 261, 262, 263, and 264. This can be seen in FIG. 4, where mounting bracket 200 contacts housing 300 through flange 262 (additional flanges are not visible from the angle shown). Reduced surface contact results in reduced heat transfer. Reduced heat transfer is an important consideration because it reduces and/or eliminates the need for insulating materials inside mounting bracket 200. Moreover, reduced contact area allows mounting bracket to be made of a material such as steel, which has relatively high heat conductivity.

Reduced heat transfer resulting from reduced contact area is one feature by which mounting bracket 200 protects controller 100's circuitry from overheating. An additional thermal management feature is mounting bracket 200's hollow shape. As described further herein, when controller 100 is engaged with mounting bracket 200, the hollow shape allows for an air gap, which in turn forms a thermal barrier 290 (see e.g. FIG. 8) protecting controller 100 from heat when controller 100 is engaged with mounting bracket 200 via slot 270.

More specifically, turning again to FIG. 4, mounting bracket 200's front surface 210 includes an elongated slot 270 through which electronic controller 100 (and specifically, engagement members 170, 180) may be received. Slot 270 is shown to be generally rectangular, with rounded corners, extending generally the length of mounting bracket 200's front surface 210. Slot 270 is sized and aligned to mate with corresponding engagement members 170, 180. In some embodiments, slot 270 mates with a controller having only one engagement member 170 (see e.g. FIG. 2B). It should be understood that slot 270 and its corresponding engagement member(s) may take various shapes and sizes. For example, instead of being generally rectangular, an oval slot (and corresponding oval engagement member(s)) may be used.

A lower lip 271 extends generally the length of the slot's bottom edge. Lower lip 271 provides support to electronic controller 100 when it is engaged with mounting bracket 200. An upper lip 272 (see e.g. FIGS. 5C, 5D, and 8) may also be provided. Both are perpendicular to front surface 210 and parallel with respect to each other.

Together, lower lip 271 and upper lip 272 guide controller 100's engagement members 170, 180 into slot 270 to a fastened position in which controller 100's spring element(s) 190, 195 engage corresponding tabs in the mounting bracket 200. For example, mounting bracket 200 may include tabs 280, 281, which mate with a corresponding spring element 190, 195 on controller 100, thereby securely fastening controller 100 to mounting bracket 200 when inserted. Throughout this disclosure, tabs 280, 281 are shown to extend generally perpendicular to slot 270 and along the left and right edges of slot 270, but it should be understood that tabs 280, 281 may be configured in any number of positions, including for example along the top and/or bottom edge.

Figure 7A:
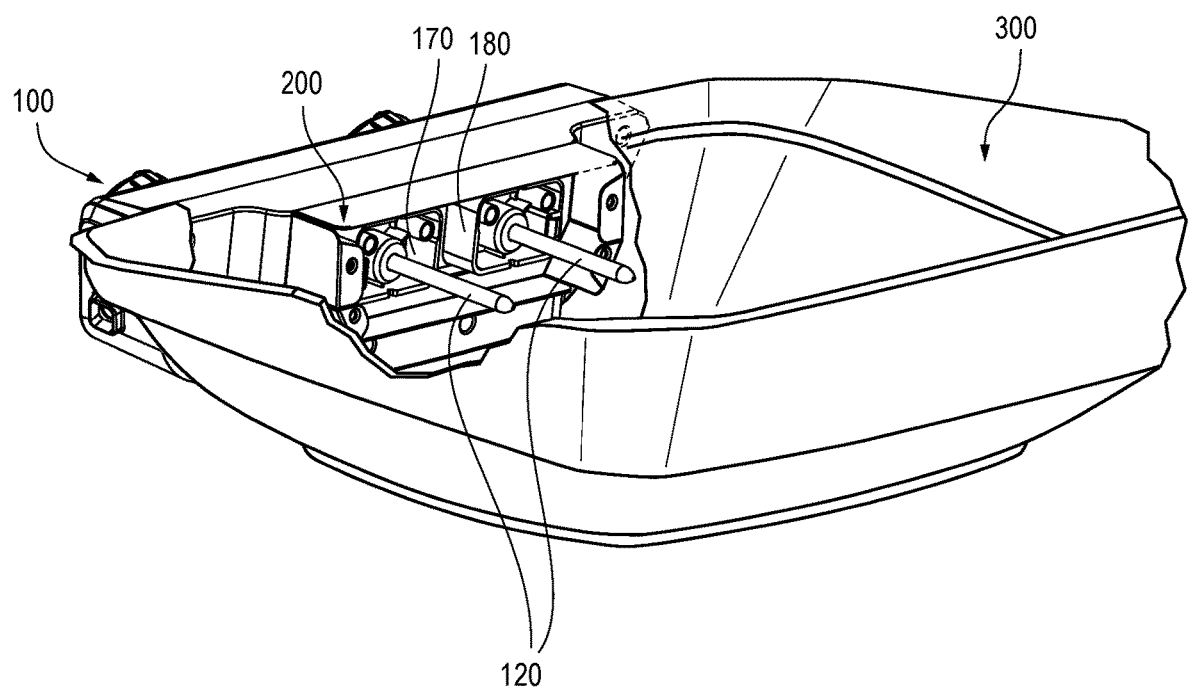
FIG. 7A is a rear view of an electric grill having a partially cut-away housing to which a mounting bracket is affixed, with an engaged controller.
Figure 7B:
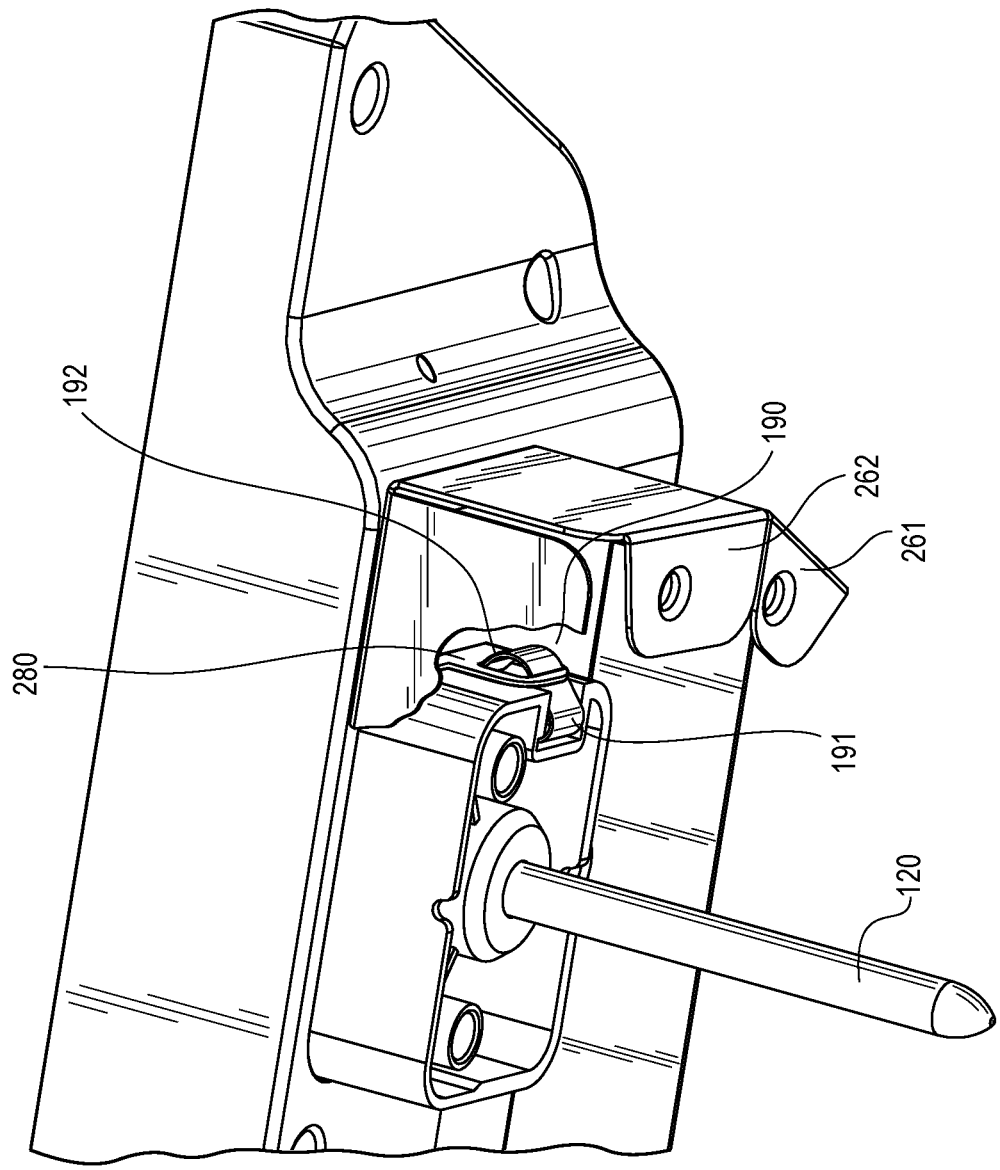
FIG. 7B is a top-down view of a controller engaged to a mounting bracket.
Figure 7C:
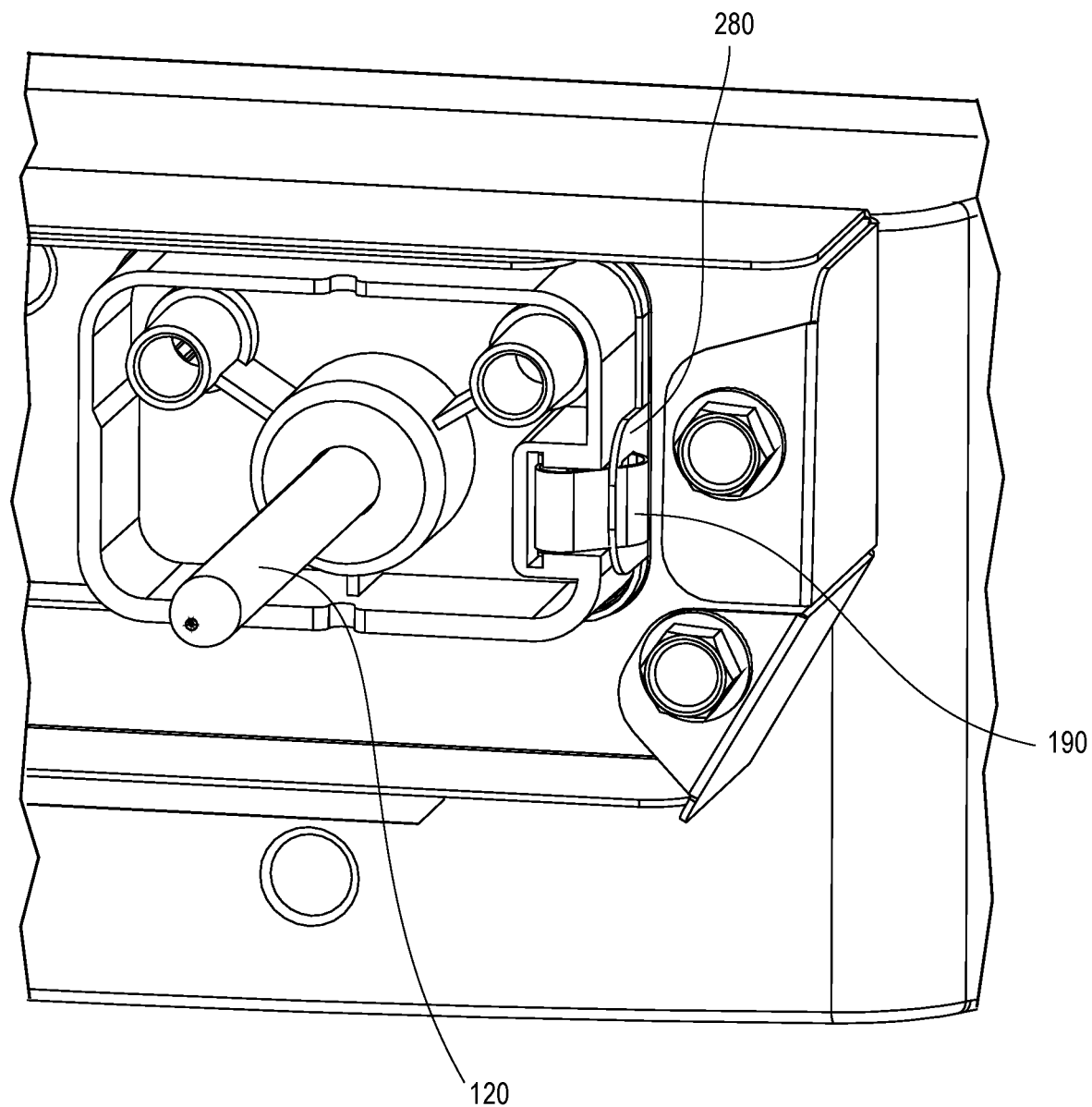
FIG. 7C shows a controller engaged to a mounting bracket.

Spring elements 190, 195, which are aligned with tabs 280, 281, are shown in the fastened position in FIGS. 7A, 7B, and 7C. In particular, FIGS. 7A, 7B, and 7C show controller 100 in the fastened position, which is to say that spring elements 190, 195 are engaged with tabs 280, 281. FIG. 7A shows controller 100 mounted on mounting bracket 200 and extending into housing 300. In FIGS. 7B and 7C, housing 300 is cut-away to provide a closer perspective of engagement members 170, 180 and spring elements 190, 195 engaging tabs 280, 281.

It should be understood that tabs 280, 281 may take various forms that can engage with spring elements 190, 195, and the inventions are not limited by the form of engagement between tabs 280, 281 and spring elements 190, 195.

For example, FIG. 5A shows tab 280 having an opening for receiving and engaging a spring element 190. In other words, spring element 190 expands into tab 280's opening, thereby fastening controller 100 to bracket 200. An alternative embodiment is shown in FIG. 5B, wherein tab 280 is a bent tab, also called an S-tab, which may engage spring element 190. Using an S-tab may provide better control of the force required to engage and disengage a spring element, as S-tabs provide less friction than tabs with openings. This is because S-tabs have only rounded edges, and no leading edges, providing a smoother interface when engaging a spring element.

It can be seen that spring elements 190, 195 are positioned on controller 100, and more specifically on engagement members 170, 180, in a configuration that aligns with tabs 280, 281 when in the fastened position. In other words, spring elements 190, 195 are aligned opposite tabs 280, 281 such that spring elements 190, 195 and tabs 280, 281 mate when electronic controller 100 is in the fastened position. Preferably, spring elements 190, 195 have an angled leading edge 191 and trailing edge 192 (See e.g. FIG. 7B). Forcing an angled leading edge 191 against a tab 280, 281 causes the spring element 190, 195 to depress. In such embodiments, a user may insert electronic controller 100 into slot 270, and, with enough force, spring elements 190, 195 will engage their corresponding tabs 280, 281. Likewise, electronic controller 100 can be disengaged from slot 270 by pulling with sufficient force. It should be understood that the elasticity of spring elements 190, 195 determines the force required to secure (and remove) electronic controller 100.

Preferably, spring elements 190, 195 are made of a conductive metal to establish an electrical contact with tabs 280, 281, and by extension, with housing 300. Electricity can then be conducted from spring elements 190, 195 to power cord 110 and to a wall outlet (e.g., ground). Spring elements 190, 195 are one means for fastening controller 100 to mounting bracket 200, but embodiments of the inventions may incorporate any known fastening means.

Figure 8:
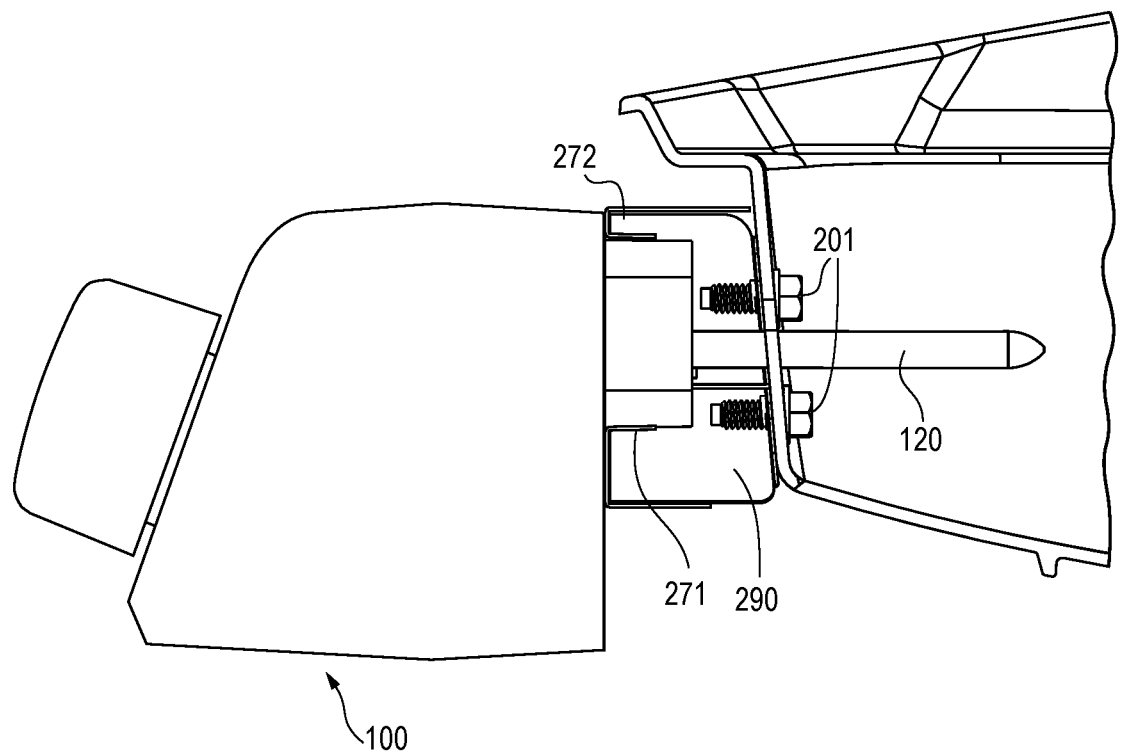
FIG. 8 is a cut-away cross-section showing an electric grill's controller engaged with a mounting bracket and a housing.

Once controller 100 is engaged with mounting bracket 200, a gap, or air pocket, referred to as a thermal barrier 290, is formed in the hollow space created by the depth between mounting bracket 200's front surface 210 and back plane 260. Turning now to FIG. 8, a side-view cross section is shown in which controller 100 is seen secured to mounting bracket 200 via screws 201. Engagement members 170, 180 are contacting upper and lower lips 270, 271. Thermal barrier 290 is formed in an air gap in hollow mounting bracket 200, between controller 100 on the one side, and housing 300 on the other. Thermal barrier 290 acts to insulate controller 100 (and its internal electronics) from heat generated within the housing 300 during cooking. Thermal barrier 290 may replace the need for traditional heat insulation. In some embodiments of the inventions, the thermal barrier 290 may be between 1.3 and 1.5 inches thick, though the insulation effect is proportional to the thermal barriers thickness For example, applicant's testing has revealed that thermal barrier 290 provides 30%-50% insulation when compared to embodiments having no thermal barrier. That is to say, adding the thermal barrier 290 lowers the temperature on the controller 100 side by 30%-50%. This temperature reduction means there is no need for any traditional insulating materials inside controller 100. Traditional controllers are made from a high-temperature plastic, such as polyphenylene sulfide (sometimes referred to as "Ryton"), but embodiments of the inventions can be made with lower rated plastics. Moreover, thermal barrier 290 makes it possible to use electronics which are rated for lower temperatures. This provides the benefit of allowing a mounting bracket 200 to be formed of sheet metal (including, without limitation, steel), which makes the manufacturing process faster and cheaper, and provides a more durable product. Thus, embodiments of the inventions have the unexpected result of providing high thermal insulation despite mounting bracket 200 being formed of sheet metal, such as steel, which typically conducts heat (as opposed to providing insulation). In other words, persons of skill in the art, without having the benefit of this disclosure, would not be motivated to use sheet metal for develop a mounting bracket having a thermal barrier 290.

Figure 9:
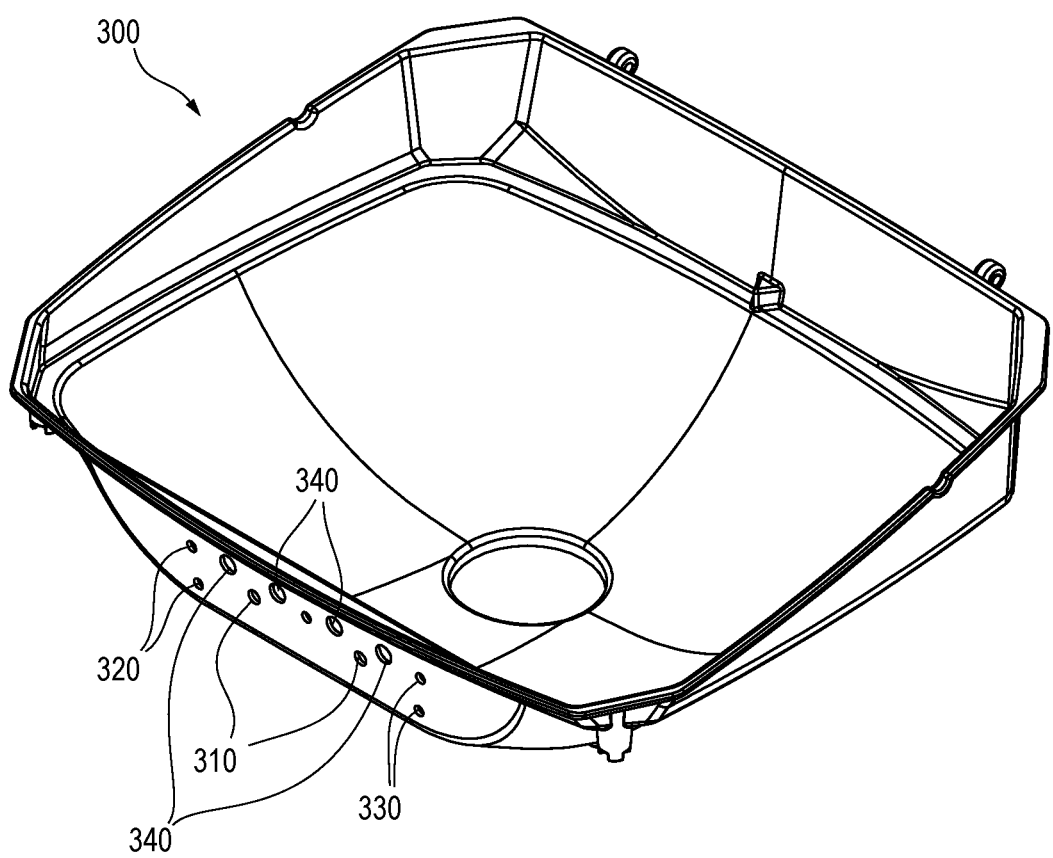
FIG. 9 is an isometric view of an electric grill's housing.

Turning now to FIG. 9, an exemplary electric grill's housing 300 is shown alone. The housing 300 has one or more openings 310 for receiving thermocouples 120, and holes 320, 330 for screwing, bolting, or otherwise affixing mounting bracket 200's flanges 261, 262, 263, and 264.

To use an electric grill embodying the present inventions, a user inserts electronic controller 100 into mounting bracket 200's slot 270. Optional lip 271 extends along slot 270's bottom edge and guides electronic controller 100, and optional upper lip 272 extends along the slot 270's upper edge. In embodiments where electronic controller 100 has one or more thermocouples 120, thermocouples 120 extend into housing 300 for measuring a cooking temperature. As electronic controller 100 is being inserted into mounting bracket 200, the leading edge of spring elements 190, 195 contact their corresponding tabs 280, 281. As seen for example in FIG. 7B, the user's pressure causes the spring element 195 to become depressed as it travels underneath tab 280, until it travels to an opening 285 in tab 280. The spring element 195's spring force causes spring element 195 to expand into tab opening 285 and in this way the electronic controller 100 becomes securely fastened to mounting bracket 200. In embodiments where mounting bracket 200 and spring elements 190, 195 are made of electrically conductive materials, such as steel, engaging spring elements 190, 195 with tabs 280, 281 establishes an electric contact between controller 100, mounting bracket 200, and housing 300. Moreover, hollow mounting bracket 200 creates a thermal barrier 290 which allows controller 100's internal electronics to function without being degraded by heat from housing 300 during cooking.

What is claimed is:

1. An electric grill assembly, comprising:
   a housing;
   a mounting bracket having a front surface, a top surface, a left side, a right side, a bottom surface, and a generally open back plane;
   said mounting bracket's back plane having at least two flanges for mounting said mounting bracket to said housing; an elongated slot spanning along the mounting bracket's front surface;
   a first and second tab respectively positioned on the slot's left and right edges; and
   an electronic controller having a power cord, and further comprising a first and second spring element, said first and second spring element being aligned to respectively engage said first and second tab when said electronic controller is attached to said mounting bracket;
   wherein the power cord is connectable to a voltage line and a neutral line such that the neutral line is in electrical communication with the first and second spring element and forms an electrical path for electrical current to flow from the housing, through the mounting bracket, through the first and second tabs, through the first and second spring elements, and to the neutral line when the electric controller is in the engaged position so as to electrically ground the housing of the electric grill; and wherein said housing, said mounting bracket, said first and second tabs, and said first and second spring elements are made of electrically conductive material.

2. The electric grill assembly of claim 1, further comprising a thermal barrier between said housing and said electronic controller when said electronic controller is attached to said mounting bracket.

3. The electric grill assembly of claim 2, further comprising at least one thermocouple attached to said electronic controller and an opening in said housing, wherein said opening is aligned to receive said thermocouple when said electronic controller is attached to said mounting bracket.

4. The electric grill assembly of claim 3, wherein said electronic controller is electro-mechanical.

5. A system for mounting an electric grill's controller to a housing, comprising:
   the housing;
   a mounting bracket having a front surface, a top surface, a bottom surface, a left side, a right side, and a back side; the mounting bracket being affixed to the housing and being in electrical communication with the housing;
   an elongated slot oriented on the mounting bracket's front surface; and
   the controller having two engagement members configured to mate with the elongated slot when the controller is in an engaged position; and a power cord connectable to the controller, the power cord having a voltage line and a neutral line;

wherein the controller is in electrical communication with the mounting bracket to form an electrical path between the neutral line, the mounting bracket, and the housing when the controller is in the engaged position so as to electrically ground the housing of the electric grill; and wherein the mounting bracket, the controller, and the two engagement members are made of an electrically conductive material.

6. The system of claim 5, further comprising a first tab and a second tab positioned on opposite edges of the elongated slot, respectively, and perpendicularly extending into the mounting bracket.

7. The system of claim 6, wherein the first and second engagement members respectively have a first and second spring element aligned to engage mounting bracket's first and second tab.

8. The system of claim 7, wherein the first and second tab each has an opening for receiving the first and second spring element when the controller is in a fastened position.

9. The system of claim 8, wherein the mounting bracket is hollow.

10. The system of claim 9, wherein the mounting bracket's hollow interior forms a thermal barrier when the controller is in a fastened position.

11. An electric grill, comprising:

a housing;

a controller connected to a power cord having a voltage line and a neutral line; and a mounting bracket having a front surface, a top surface, a bottom surface, a left side, a right side, and a back side, and an elongated slot oriented on the mounting bracket's front surface; the mounting bracket forming a thermal barrier between the housing and the controller, the bracket being mounted to the housing;

wherein the controller is removably secured to the mounting bracket when the controller is in an engaged position;

wherein the housing, the mounting bracket, and the controller are in electrical communication when the controller is in an engaged position to form an electrical path between the neutral line, the mounting bracket, and the housing when the controller is in the engaged position so as to electrically ground the housing of the electric grill; and wherein the housing and the mounting bracket forming the electrical path are made of an electrically conductive material.

12. The electric grill of claim 11, wherein the mounting bracket is made of a sheet metal.

13. The electric grill of claim 12, wherein the sheet metal is steel.

14. The electric grill of claim 13, wherein the mounting bracket is configured to receive the controller.

15. The electric grill of claim 14, wherein the controller has a plurality of spring elements for removably engaging a corresponding tab on the mounting bracket.

16. The electric grill of claim 15, wherein the controller is in electric communication with the housing.

17. The electric grill of claim 16, wherein the controller has a power cord and acts as an electric ground with respect to the housing.

18. The electric grill of claim 17, wherein the controller has at least one electric contact for a voltage line and one electric contact for a neutral line, and each electric contact is aligned with an opening in the housing for interfacing with a heating element.

\* \* \* \* \*